THEODORE KRAUSCH.

Improvement in Cooling and Ventilating Buildings.

No. 4,607. Reissued Oct. 24, 1871.

Witnesses.
C. Wahlers.
Ernst Bilhuber

Inventor.
Theodore Krausch
per
Van Santvoord & Hauff
Attys

AM. PHOTO-LITHOGRAPHIC CO. N.Y. (OSBORNE'S PROCESS.)

UNITED STATES PATENT OFFICE.

THEODORE KRAUSCH, OF NEW YORK, N. Y.

IMPROVEMENT IN COOLING AND VENTILATING BUILDINGS.

Specification forming part of Letters Patent No. 108,707, dated October 25, 1870; reissue No. 4,607, dated October 24, 1871.

*To all whom it may concern:*

Be it known that I, THEODORE KRAUSCH, of the city, county, and State of New York, have invented a new and useful Improvement in Refrigerator-Building; and I do hereby declare the following to be a full, clear, and exact description thereof, which will enable those skilled in the art to make and use the same, reference being had to the accompanying drawing forming part of this specification, in which drawing—

Figure 1:
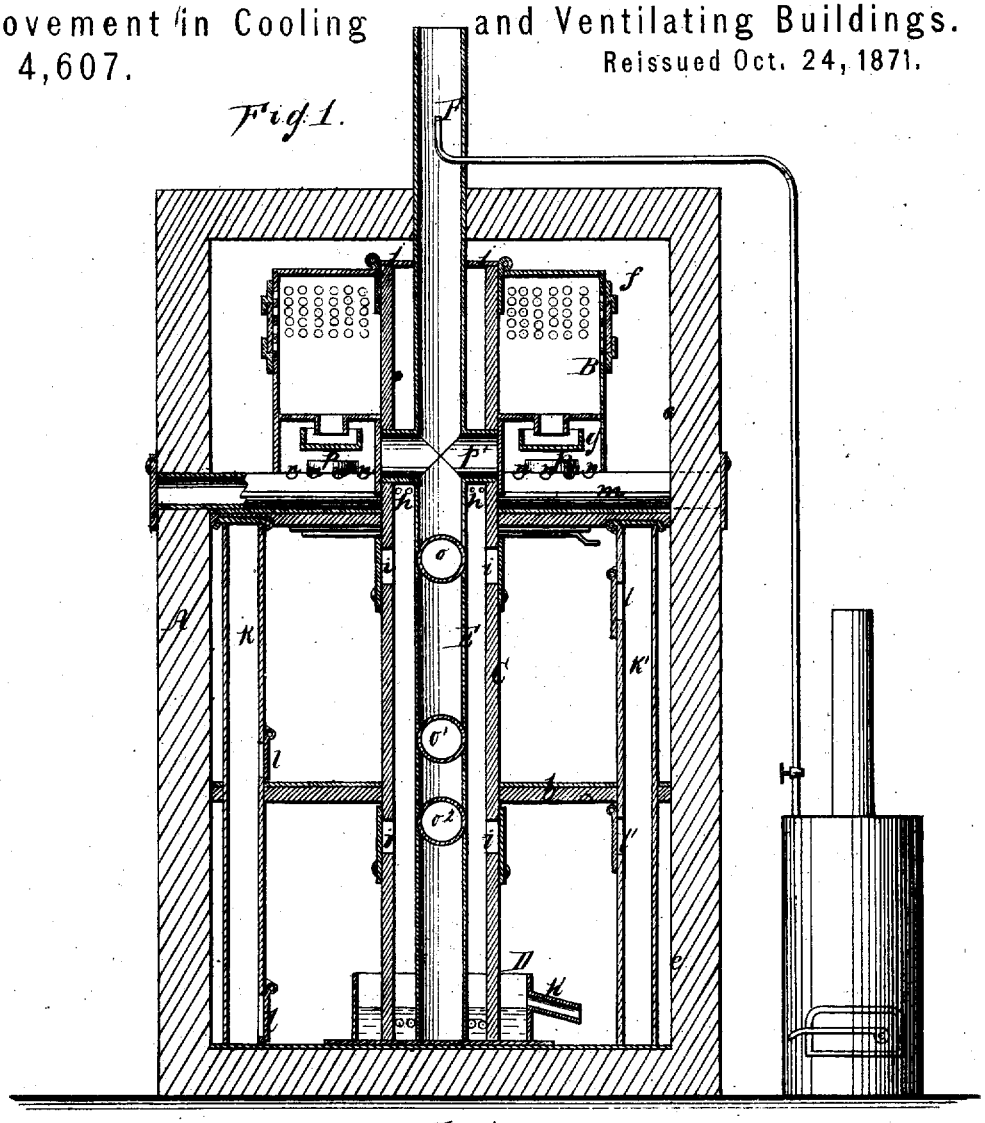
Figure 2:
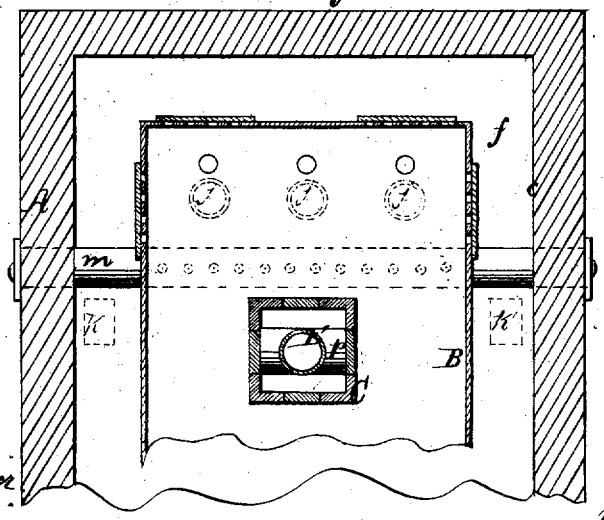

Figure 1 represents a vertical section of this invention. Fig. 2 is a horizontal section of the same.

Similar letters indicate corresponding parts.

This invention consists in the arrangement of an air-space surrounding the ice-chamber of a refrigerator-building, and communicating with an air-trunk through which the cold air descends, and from which the air can be exhausted by artificial means in such a manner that the top as well as the sides of the ice-chamber will act as a cooling-surface, and that by keeping up a circulation of air over and around the ice-chamber the ice is saved and the condensation of moisture on the inner surface of the top of the ice-chamber is prevented. The circulation of air through the refrigerator-building is increased by the suction produced by a steam-jet, which is situated in a suction-pipe extending down through the air-trunk, and which communicates through suitable apertures at different heights with the air-trunk and with the several stories of the building, so that the circulation of air through the building can be controlled without difficulty. The interior of the refrigerator-building communicates with the external air through a pipe, which is exposed to the cooling effect of the ice-water, and situated either directly below the ice-chamber or in the lower part of the ice-house. The air-space surrounding the ice-chamber also connects with side channels, so that a natural circulation of cold air can be effected through the various stories of the building.

In the drawing, A designates a refrigerator-building, which is divided off by two (more or less) floors, *a b*, into three (more or less) stories, *c d e*. On the top floor is placed the ice-chamber B, which is surrounded by an air-space, *f*, and the bottom of which is elevated above the top floor *a* so as to leave a trough, *g*, in which the ice-water collects. Through the ice-chamber and through all the floors of the building extends the air-trunk G, which rests on the ground-floor, and may be made to serve as a pillar to support the upper floors *b* and *a*. In the sides of this trunk, and on a level with the upper surface of the top floor *a*, is a series of small holes, *h*, through which the ice-water from the trough *g* passes into the air-trunk, running down on its inner sides until it reaches the bottom tank D, which is provided with an overflow pipe, *h'*. In the sides of the air-trunk are openings *i*, one or more in each story of the building, and the top of said air-trunk is provided with a cover, *j*, which can be opened or closed. When this cover is open the cold air from the air-space *f* descends through the trunk, where it comes in contact with the ice-water trickling down on its sides, so that it is still further cooled off, and by opening one or more of the openings *i* the cold air is discharged into either one or more of the stories of the building. From the ice-water trough *g* extend short pipes *p* through the top floor *a*, and suitable slides K* serve to open or close these pipes. When the pipes are open the cold air from the trough *g* descends in the story below the floor *a*. The air-space *f* also connects with vertical air-trunks *k k'*, which are provided with apertures *l l'*, the apertures *l* in the trunk *k* being close above the several floors, while the apertures *l'* in the trunk *k'* are close under the several floors. The cold air from the air-space *f* descends through the trunk *k*, discharges in either of the stories of the building, and rises through the trunk *k'*; and by these means a continuous circulation of air takes place through the building and through the air-space *f*, and the ice-chamber is thereby kept comparatively cool, and the condensation of moisture in the top of the chamber is prevented. The vertical air-trunks may also be used in combination with the central air-trunk. Through the trough *g* extends a horizontal pipe, *m*, which communicates with the external air, and which is exposed to the cooling effect of the ice-water in the trough. In this pipe are openings *n*, and, if the pipes *p* are open, the external air passes in through the pipe *m*, where it is cooled by the action of the ice-water, and then it passes down through the pipes *p*.

In order to create an artificial circulation of air through any building I pass a pipe, E, down through the center of the air-trunk C and out through the top of the building. In the upper part of this pipe I introduce a steam-jet, F, and its lower part is provided at certain intervals with openings $o\ o^1\ o^2$ leading into the air-trunk, or with cross-pipes $p'$ extending through the sides of the air-trunk and communicating with the space or spaces surrounding said air-trunk. If the openings $i$ in the sides of the trunk are opened and the steam-jet is started, the air from the top part of each story is sucked into the pipe E and driven out of the steam-jet, a fresh supply of air being drawn in through the horizontal pipe $m$ or otherwise. I use a steam-jet for the purpose of producing the artificial circulation in my building, because such steam-jet requires not much outlay for machinery and no attention; and, if it is connected with a steam-generator—which is on hand in every brewery or other place where my refrigerator-building is to be used—it (the steam-jet) can be started or stopped simply by turning a stop-cock.

It will be seen that my refrigerator-building differs from others, especially in the following particulars: First, the ice-chamber being surrounded by an air-space the whole cooling effect of the ice is given to the air. Second, the flues or ducts for admitting and removing air from the building, and for circulating the air through the building, are so arranged that the particular temperature required in each room may be secured, and it may be ventilated more or less as demanded by the special operation carried on within it. These features give my invention great value in the construction of breweries, packing-houses, and the like.

What I claim as new, and desire to secure by Letters Patent, is—

1. In a refrigerator-building, an ice-chamber surrounded by an air-space so as to permit a circulation of air around and over the ice-chamber, substantially as described.

2. One or more air-trunks, connecting the several chambers of a refrigerator-building with the space surrounding the ice-chamber, so as to distribute the cold air, as set forth.

3. Air-supply pipes $m$, in combination with the trough $g$, which receives the water from the ice-chamber, so that the air as it enters is cooled by the waste-water from the ice-chamber.

4. The flue or trunk $e$ passing through the building, and connected, by means of suitable openings, to one or more apartments, and provided with a steam-jet or other equivalent ventilating device, so that the air may be changed in any of the apartments of the building at will, substantially as set forth.

5. The main trunk C, provided with openings and valves on different floors, in combination with ventilating-flues $e$ or their equivalent.

6. The flues $k\ k'$ with suitable side openings on different floors, so as to circulate the air from the ice-chamber to the several rooms of the building, as described.

7. The method described of arranging the flaps or shutters so that they will close by their own weight, and open automatically by an increase of pressure on their inside.

8. The pipe E, inclosed within the air-trunk C, and communicating with the latter, as described, with the air-space $f$ surrounding the ice-chamber B, said air-space and ice-box being arranged in the top part of the building and operating in connection with the lower rooms, substantially as and for the purpose described.

9. The vertical air-trunks $k\ k'$, central pipe E inclosed within the air-trunk C, in combination with the air-space $f$ surrounding the ice-chamber B, and operating with reference to the lower rooms, as herein shown and described.

10. In combination, the air-space $f$ surrounding the ice-chamber B arranged in the top of a building, and the central pipe E of a steam-jet, applied and operating as herein set forth.

11. The pipe $m$ with openings $n$, in combination with stand-pipe $p$ of the waste-chamber, for the purpose of cooling the incoming currents of air.

Witnesses: THEODORE KRAUSCH.
J. KOENIGSBERG,
W. HAUFF. (58)